(No Model.)

D. B. HOISINGTON.
HARROW.

No. 354,790. Patented Dec. 21, 1886.

Witnesses.
A. Ruppert.
R. E. Grant.

Inventor:
D. B. Hoisington
Per
Thomas P. Simpson
Atty

UNITED STATES PATENT OFFICE.

DAVID B. HOISINGTON, OF McPHERSON, KANSAS.

HARROW.

SPECIFICATION forming part of Letters Patent No. 354,790, dated December 21, 1886.

Application filed May 21, 1886. Serial No. 202,925. (No model.)

*To all whom it may concern:*

Be it known that I, DAVID B. HOISINGTON, of McPherson, in the county of McPherson and State of Kansas, have invented a Sulky-Harrow, of which the following is a specification.

Figure 1:
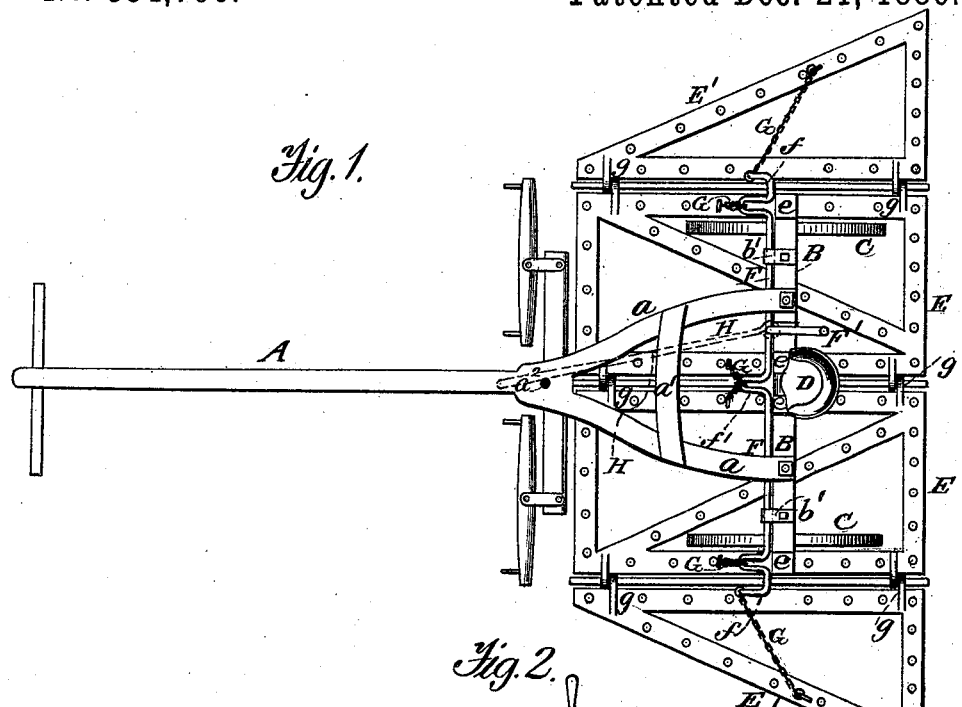
Figure 2:
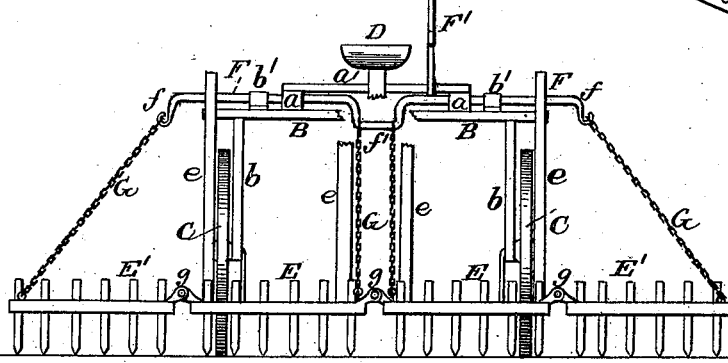
Figure 3:
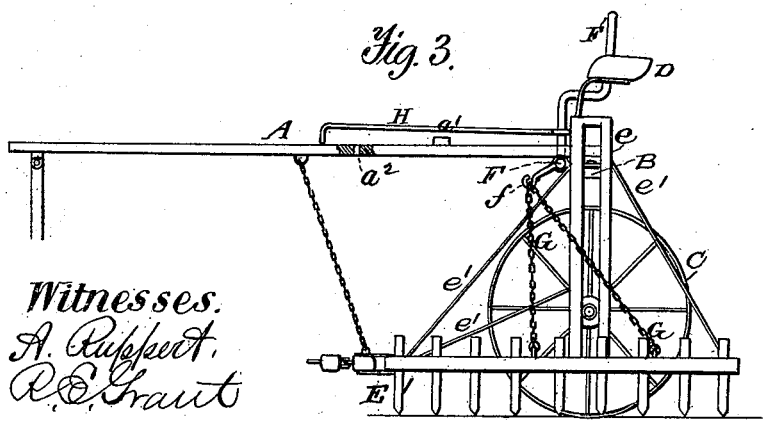

Figure 1 of the drawings is a plan view; Fig. 2, a rear elevation, and Fig. 3 a side elevation.

In the drawings, A represents the pole having hounds $a$, across which is placed the footboard $a'$. The pole ends are made fast to a cross-bar, B, from which depend the hangers $b\ b$, each provided with a journal to receive a wheel, C. The seat D and axle-frame B $b$ are thus supported on the wheels C C, while the harrows E E are provided with the fixed vertical guides $e\ e$, in which pass the outer ends of the hubs of the wheels C C. These guides are supported in a vertical position by the braces $e'\ e'$, extending from the harrow-frames. In front of the axle-frame B are placed the bearings $b'\ b'$, in which turn the rod F F, cranked at $f f'$ on and near each end, and from these cranks extend chains G, which connect with the harrows E E and their wings E' E', both harrows and wings hinged at $g$. The cross bar or rod F is provided with a handle, F', projecting upon one side of the seat, so as to be conveniently within reach of the driver.

By pulling back upon the handle F' the harrows are all lifted above the tread of the wheels, and by fastening the detainer H in the hole $a^2$ of the pole they are so held when the harrow is being carried to or from the field. By unfastening the detainer H on the field the harrows will at once drop by their gravity on the plowed ground.

By means of the lever-handle F' the harrows may be raised to pass over any obstruction and then dropped, and in order to pass through a gate the outer chains on the wings may be hooked up short on the ends of the rod F. The front end of each harrow may be connected by a chain with the pole.

What I claim as new, and desire to protect by Letters Patent, is—

1. In a sulky-harrow, the harrows E E, provided with rigid vertical guides $e\ e$, that receive the outer ends of the wheel-hubs and slide up or down thereon, as described.

2. In a sulky-harrow, the crank-rod F F', connected with and adapted to lift the harrows, of the detainer H, locking in the hole $a^2$ of the pole or tongue, as shown and described.

DAVID B. HOISINGTON.

Witnesses:
ALBERT PICKETT,
T. J. SWITZER.